W. JOHNSON.
Bungs and Bushes.

No. 165,001.　　　　　　　　Patented June 29, 1875.

WITNESSES.
A. Schattenberg
H. P. Schnobley.

INVENTOR:
William Johnson
By W. B. Smith
Wm. Pact.

THE GRAPHIC CO.PHOTO-LITH.39 & 41 PARK PLACE,N.Y.

UNITED STATES PATENT OFFICE.

WILLIAM JOHNSON, OF OZAUKEE, WISCONSIN.

IMPROVEMENT IN BUNGS AND BUSHES.

Specification forming part of Letters Patent No. 165,001, dated June 29, 1875; application filed March 18, 1875.

*To all whom it may concern:*

Be it known that I, WILLIAM JOHNSON, of Ozaukee, in the county of Ozaukee, in the State of Wisconsin, have invented certain Improvements in Bungs and Bushes, of which the following is a specification:

My invention has for its object the fitting of a bush and bung into a cask or barrel, so that they shall be permanent, and take the place of the iron bushes and wooden bungs in use; it is a metal bush with a screw on it, so that it may be screwed tight into a cask, and the opening for the bung is made larger on the inside than on the outside, and a bung of metal and rubber made so that by screwing it up with a nut on the screw of the bung, will expand the rubber and make it press out against the walls of the bush, and thus make it tight. The bung is made of two pieces of metal, made cone-shaped, facing each other, and a rubber ring between the two cone-shaped pieces of metal, and a nut on the top, which screws onto a bolt, which is attached to the lower piece of metal, which, when screwed up, swells out the rubber, so as to make the bung tight in the bush.

Figure 1:
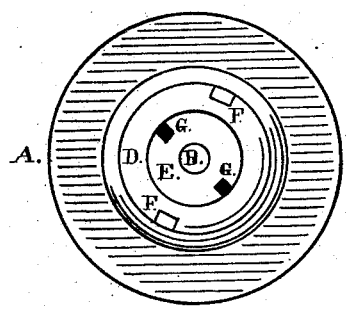
Figure 2:
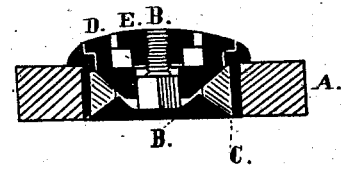
Figure 3:
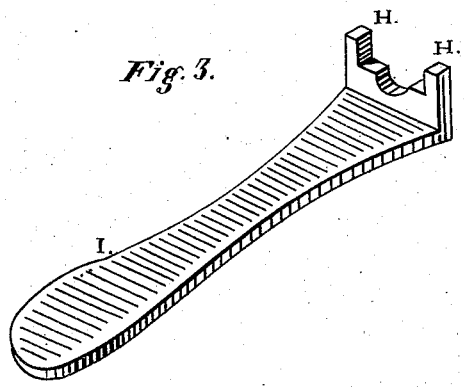

Figure 1 is a top view of the bung and bush; Fig. 2, a sectional view of same in line *x x*, Fig. 1; and Fig. 3, a view of the wrench by which the bung is screwed up.

A is the bush; B, the bottom piece of the bung, with a screw-bolt on it passing through the bung; C, a rubber ring, which lies on the bottom piece B, which is made cone-shaped, when it comes in contact with the ring; D, a metal top piece, made cone-shaped and placed on the top of rubber ring C, the cone coming in contact with the ring; E, a nut, which fits into a recess in the top of piece D, and screws onto the screw-bolt in piece B; F F, projections on the inside of bush A, which the piece D, having corresponding notches or slots on its outside, slips on over, and is held from turning by them when the nut E is screwed up. G are slots or notches in the outside of nut E, into which prongs H of wrench I fit to screw it up.

The operation is as follows: The bung is put together as shown, Fig. 2, and dropped into the bush A, which is screwed into a barrel, and then, with wrench I, the nut E is screwed up, and the pieces B and D being brought together, the cones in them force the rubber ring C out and make it tight, and the bush being larger on the inside than on the outside, the harder the bung is pushed out the tighter it gets.

I claim—

A bung consisting of cone-shaped pieces B and D, in combination with rubber C and nut E, sunken in piece D, substantially as described.

WILLIAM JOHNSON.

Witnesses:
 LYMAN MORGAN,
 J. B. SMITH.